Patented June 1, 1937

2,082,625

UNITED STATES PATENT OFFICE 2,082,625

METHOD OF PRODUCING A GERMICIDAL PREPARATION

Merrill C. Hart, Kalamazoo, Mich., assignor to The Upjohn Company, Kalamazoo, Mich.

No Drawing. Application December 31, 1934, Serial No. 760,041

3 Claims. (Cl. 260—154)

This invention relates to improved germicidal products and the method of producing the same, and has for its objects, First, to produce a new and improved germicidal preparation which is non-specific and general in its action and not toxic or injurious to humans in effective germicidal concentrations.

Second, to provide such a preparation comprising alkylated phenols or substituted phenols, specifically cresols resulting from the condensation of such phenols or cresols with an alcohol.

Third, to provide such a preparation comprising alkylated cresols resulting from the condensation of U. S. P. cresol, which is a mixture of ortho, meta and para cresols with an amyl alcohol.

Fourth, to provide such a preparation comprising the more germicidally active alkylated cresols, particularly amyl cresols which are separated from the above mentioned condensation product by means of an alkali solution, specifically sodium hydroxide.

Fifth, to provide such a preparation which comprises an alkali solution of such more germicidally active fraction.

Sixth, to provide a method of making a germicide comprising the condensation of an excess of U. S. P. cresol which includes ortho, meta and para cresols with an alcohol, specifically amyl alcohol, which results in the production of a greater proportion of the more germicidally active alkylated cresol.

Seventh, to provide a method of producing such a germicide comprising separating from the condensation product the more active alkylated cresols by using an alkali solution, specifically sodium hydroxide.

Further objects and advantages pertaining to details and economies will appear from the description to follow. The invention is pointed out in the claims.

My invention comprises the condensation of U. S. P. cresol, which may be referred to for convenience as tri-cresol, since it is a mixture of ortho, meta and para cresols, with an alcohol in the presence of zinc chloride, either with or without the presence of free hydrochloric acid. For the purpose of producing my improved germicide, I find that amyl alcohols are most satisfactory because the condensation product is sufficiently general to serve as an all purpose germicide for practical use and is sufficiently non-toxic to humans to be safe for such use. It will be appreciated that other alcohols can be used but that the alcohols containing a greater number of carbon atoms tend to produce a more specific germicide, although less toxic to humans, while the alcohols having a lesser number of carbon atoms are more toxic and somewhat more general in their germicidal action. I have used specifically, with very satisfactory results, normal amyl alcohol, secondary amyl alcohol, iso amyl alcohol, and tertiary amyl alcohol. I find that they all produce a highly satisfactory germicide in that it is not too specific and is substantially non-toxic to humans. I have tried other alcohols with more or less carbon atoms and find that they react in the same general way as indicated above.

The condensation product is a very satisfactory germicide without further treatment, but I have found that certain of the alkylated cresols produced by the condensation are more germicidally active than others, and I have found that the more germicidally active fractions are those that are most soluble in a solution of sodium hydroxide or other alkali. I have found, in addition, that the germicidal strength of the fraction is in a ratio inversely related to the strength of the alkali solution which will separate it from the remainder of the condensation product.

By following out my method of manufacture, I am able to easily separate a fraction of the original condensation product that is at least twice as active as a germicide when tested against Staphylococcus aureus by the modified F. D. A. method at a temperature of 37 degrees C. than is the original product. I have also found that by using an excess of tri-cresol in preparing the condensation product, it is possible to form a greater proportion of this more germicidally active fraction and to largely avoid the formation of high boiling, non-germicidal fractions in the condensation product.

As specific examples of the carrying out of my invention, the following are illustrative:

972 grams of tri-cresol (9 moles) which is an excess of the tri-cresol over the necessary equivalent weights for carrying out the reaction, and 1005 grams of zinc chloride (7½ moles) is heated with stirring to approximately 150 to 160 degrees C., and 528 grams (6 moles) of normal amyl alcohol are added over a period of 3½ to 4 hours. The resulting mixture is refluxed at this temperature for about 4 hours, and upon cooling the mixture is washed twice with four litres of water and is then distilled in vacuo, giving 474 grams of an oil having a boiling point of about 145 to 160 degrees C. at 21 mm. of mercury.

This product is shaken with 2⅔ litres of 10% sodium hydroxide solution and allowed to stand and separate into a clear alkaline solution of the active germicidal product and a supernatant oil which consists essentially of the germicidally non-active fraction of the original condensation product.

It will be appreciated that other alkalies, such as potassium hydroxide or ammonium hydroxide and other basic substances, could be used to effect this separation but that the sodium hydroxide solution is a very convenient, cheap and satisfactory solution to employ. The alkaline solution is separated from the supernatant oil and is then acidified with a mineral acid which may be hydrochloric, sulfuric or nitric acid, or any other suitable acidifying agent, and the resulting oily precipitate is separated and purified by vacuum distillation. This final oily product is the most active germicidal fraction of the original condensation product and may be used as a germicide as it is finally purified.

It will be appreciated that the original condensation product could be used as a germicide without the concentrating and purifying processes. In order to provide a commercial germicide of clear and attractive appearance, the resulting oily material may be dissolved in sodium hydroxide or some other alkali solution for final sale.

As another example of carrying out my invention, 528 grams of tertiary amyl alcohol may be used in place of the same amount of normal amyl alcohol. This produces 357 grams of the final germicidal oil having a boiling point between 140 and 160 degrees C. at 27 mm. of mercury.

As an additional example, iso amyl alcohol when condensed with the tri-cresol according to the example given above, gave a germicidal oil weighing 363 grams and boiling at 143 to 160 degrees C. at 24 mm. of mercury pressure.

Secondary amyl alcohol used gave 579 grams of germicidal oil having a boiling point of 150 to 165 degrees C. at 27 mm. of mercury pressure.

It will be understood that in the last stated examples the original condensation product could be used as a germicide without the concentration and purification referred to, and that the separation could be carried out by using any of the substances mentioned. The above examples are given merely as illustrations of the general principles embodied in my invention. Other proportions of the ingredients may be used and the hydrochloric acid referred to as a catalyst in the condensation of the tri-cresol with the alcohols may be used or not as desired, and that other alkalies or percentage of alkalies may be used in separating the germicidal fractions of the condensation product.

It will be fully appreciated that my invention applies with equal force to other alcohols and to other phenols and substituted phenols, and that the invention applies also to the use of the isolated ortho, meta and para cresols not combined as in U. S. P. cresol. I have found that the use of the mixture of cresols is more effective than the use of the isolated cresols, and is also more satisfactory in that it is also a commercial product easily obtainable.

Having thus described my invention, what I claim as new and desire to secure by Letters Patent is:

1. The method of preparing a germicide comprising condensing an appreciable excess of a cresol with an amyl alcohol to produce amylated cresol, mixing the condensation product with an alkali solution of a strength to dissolve a portion only of the condensation product, separating the clear solution from the undissolved portion of the condensation product and retaining the clear solution, acidifying the clear solution to precipitate the dissolved amyl cresol, and separating and retaining as a germicide the precipitated amyl cresol.

2. The method of preparing a germicide comprising condensing an appreciable excess of a cresol with an amyl alcohol to produce amylated cresol, mixing the condensation product with an alkali solution of a strength to dissolve a portion only of the condensation product, separating the clear solution from the undissolved portion of the condensation product and retaining the clear solution as the germicide.

3. As a step in the method of preparing a germicide the condensing an appreciable excess of a cresol with an amyl alcohol to produce amylated cresol.

MERRILL C. HART.